United States Patent [19]

Mabuchi

[11] Patent Number: 5,474,150
[45] Date of Patent: Dec. 12, 1995

[54] BATTERY OPERATED WHEELED VEHICLE

[75] Inventor: Takashi Mabuchi, Uithoorn, Netherlands

[73] Assignee: Yamaha Motor Europe N.V., Schiphol, Netherlands

[21] Appl. No.: 241,580

[22] Filed: May 12, 1994

[30] Foreign Application Priority Data

May 13, 1993 [NL] Netherlands ............................ 9300821

[51] Int. Cl.6 ............................ B62D 61/02; B60R 16/04
[52] U.S. Cl. .......................................... 180/220; 180/68.5
[58] Field of Search ...................................... 180/65.5, 220, 180/68.5, 6.5, 55, 60, 214; 280/288.4

[56] References Cited

U.S. PATENT DOCUMENTS

| | | | |
|---|---|---|---|
| 572,036 | 11/1896 | Theryc ................................ | 180/220 X |
| 3,800,898 | 4/1974 | Griffin . | |
| 4,346,777 | 8/1982 | Restelli ................................. | 180/220 |
| 5,199,520 | 4/1993 | Chen ..................................... | 180/65.5 |
| 5,207,288 | 5/1993 | Ono ..................................... | 180/65.5 X |
| 5,272,938 | 12/1993 | Hsu et al. ............................ | 180/65.5 X |
| 5,341,892 | 8/1994 | Hirose et al. ........................ | 180/65.5 X |
| 5,366,037 | 11/1994 | Richey .................................. | 180/65.5 |

FOREIGN PATENT DOCUMENTS

| | | | |
|---|---|---|---|
| 03966073 | 11/1990 | European Pat. Off. ............... | 180/65.5 |
| 2264676 | 10/1975 | France .................................... | 180/220 |
| 3033825 | 4/1982 | Germany . | |
| 3632781 | 3/1988 | Germany .............................. | 180/65.5 |
| 4000960 | 7/1991 | Germany . | |
| 9214027 | 2/1993 | Germany . | |
| 2224984 | 5/1990 | United Kingdom ................... | 180/65.5 |

*Primary Examiner*—Brian L. Johnson
*Attorney, Agent, or Firm*—Roylance, Abrams, Berdo & Goodman

[57] ABSTRACT

A wheeled vehicle, in particular a two-wheeler, is provided with a frame supported by running wheels, with an electromotor, for driving at least one of the running wheels, and with at least one battery provided on the frame for supplying energy to the electromotor, characterized in that the battery is disposed near the wheel hub of one of the wheels.

11 Claims, 2 Drawing Sheets

BATTERY OPERATED WHEELED VEHICLE

FIELD OF THE INVENTION

The invention relates to a means of transport, in particular a two-wheelers, provided with a frame supported by running wheels, with an electromotor, by means of which at least one of said running wheels can be rotated, and with at least one battery provided on the frame for supplying energy to said electromotor.

BACKGROUND OF THE INVENTION

With respect to such a means of transport, in particular a bicycle equipped with an auxiliary motor in the shape of an electromotor, it has been proposed to arrange the required battery (batteries) near the usual carrier mounted above the rear wheel. The disadvantage of such an arrangement is not only that in this manner space available for taking luggage is lost, but also that this has an adverse effect on the position of the center of gravity of the means of transport.

SUMMARY OF THE INVENTION

The object of the invention is to obtain a means of transport of the above kind, wherein the drawbacks described can be avoided.

According to the invention this can be achieved in that the battery or batteries is (are) disposed near the wheel hub of one of the wheels.

By using the construction according to the invention the battery or batteries can be incorporated in the wheel of the means of transport in an advantageous manner, so that the battery or batteries do(es) not form an impending attachment to the means of transport, whilst at the same time the position of the battery or batteries do(es) not have an adverse effect on the position of the center of gravity of the means of transport.

BRIEF DESCRIPTION OF THE DRAWINGS

The invention will be explained in more detail hereafter with reference to the accompanying Figures.

DETAILED DESCRIPTION OF THE INVENTION

Figure 1:
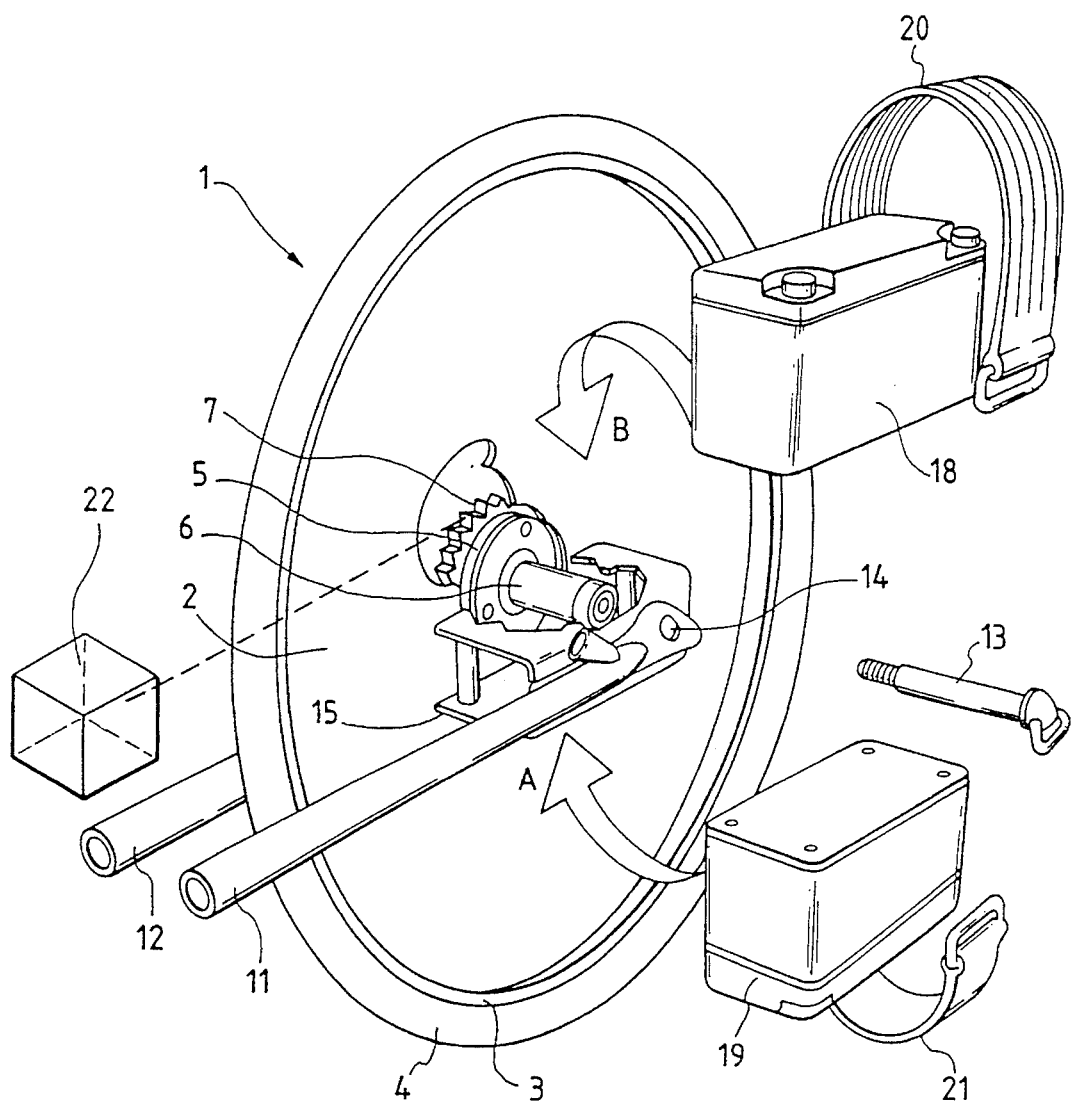
FIG. 1 is a perspective view of a rear wheel of a means of transport with two batteries, wherein the various parts are shown some distance apart.
Figure 2:
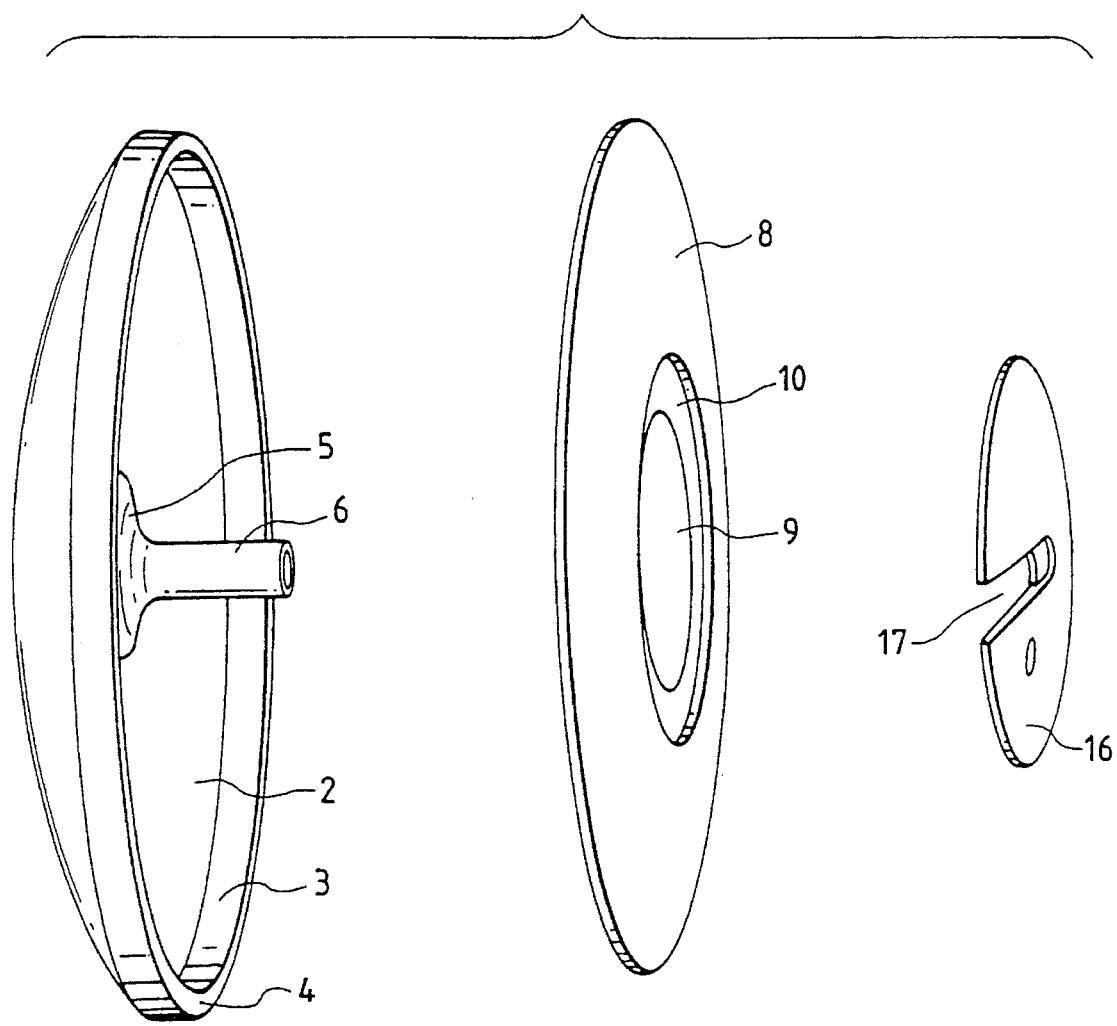
FIG. 2 is a perspective view of parts of the wheel of the means of transport, which are shown some distance apart.

As is shown in FIGS. 1 and 2 the wheel 1 of a means of transport, in particular a two-wheeler such as for example described in the applicant's printing dutch Patent Application No. PCT 93-00821, comprises a dome-shaped disc 2, to whose circumference a rim 3 is secured. A pneumatic tire 4 is fitted on the rim 3 in a usual manner.

A hub 6 is mounted in the center of the dome-shaped disc 4 by means of a supporting plate 5. Furthermore one or more chain wheels 7 are secured to said supporting plate 5.

A second dome-shaped disc 8 may be fixed to the wheel 1, near the inner circumference of the rim 3, in such a manner that a space is defined between the two dome-shaped discs 2 and 8. The dome-shaped disc 8 has a large opening 9 in its center and an annular strip 10, which extends in the direction of the opposite dome-shaped means 2, is secured to the boundary edge of said opening.

The wheel 1 can be supported, in the manner shown in FIG. 1, by the two tubes 11 and 12 for example forming a rear fork of a bicycle, by means of a pin 13, which can be passed through holes 14 provided in the ends of the tubes 11 and 12 and through the hub 6 for this purpose.

A support 15, of U-shaped section in the illustrated embodiment, is secured to the end of the tube 11, the construction being such that in mounted condition of the wheel the hub 6 extends between the two legs of said U-shaped support 15 and said support 15 is located in the space within the wheel bounded by the annular strip 10. This space can be covered at the side remote from the closed dome-shaped disc 2, by means of a cover 16 closing the opening 9. Said cover is provided with a slotted hole 17, which radially extends from a boundary edge of the cover 16 to beyond the center of the cover. Said slotted hole 17 is necessary in order to be able fit the cover 16 after the wheel has been mounted in the rear fork or the like. The cover 16 may be provided with a suitable locking device for fixing the cover to the wheel 1.

The support 15 is used for supporting two batteries 18 and 19, which function to supply energy to an electromotor 22 mounted on the means of transport, by means of which said means of transport can be driven. As is indicated by arrows A and B, the battery 18 may be provided on top of the support 15, while the battery 19 may be placed against the bottom side of said support, after which said batteries may be connected to the support 15 by means of clamping straps 20 and 21 respectively so as to be readily detachable.

It will be apparent that since the batteries 18 and 19 are disposed in the center of the wheel said batteries do not form impeding projections and will not affect the position of the center of gravity of the means of transport thereby. The space in which the batteries are arranged within the wheel is readily accessible through the opening which can be closed with the removable cover 16, so that the batteries are readily accessible or exchangeable when they need to be recharged.

Furthermore it will be apparent that the invention is not limited to the illustrated embodiment of the wheel. Thus it will for example be possible to use dome-shaped discs having a smaller diameter, whereby the outer circumferences of such dome-shaped discs may for example be connected to the rim 3 by spoke-shaped means.

I claim:

1. A wheeled vehicle comprising:

a vehicle frame having two spaced apart supporting members;

an electromotor mounted on said vehicle frame;

a substantially U-shaped support secured to an end of one of said supporting members and being positioned between said supporting members;

at least one ground engaging drive wheel operatively connected to said electromotor and being mounted between said supporting members and having a hub rotatably coupled to each supporting member, said drive wheel including a first dome shaped disk, a second dome-shaped disk having a central opening and being coupled to said first dome-shaped disk, wherein said first and second dome-shaped disks define a central space, and a cover coupled to said second dome-shaped disk closing said central opening; and first and second batteries connected to said electromotor and being mounted on said U-shaped support near said hub without affecting the center of gravity of said vehicle.

2. The wheeled vehicle of claim 1, wherein said batteries are disposed in said central space and enclosed by said first and second dome-shaped disks and said cover.

3. The wheeled vehicle of claim 1, wherein said two spaced apart supporting members define a fork coupled to said drive wheel.

4. The wheeled vehicle of claim 1, wherein said U-shaped support includes a pair of legs extending toward said drive wheel and wherein said hub of said drive wheel extends between said legs.

5. The wheeled vehicle of claim 1, wherein said first dome-shaped disk couples said hub to a rim of said drive wheel.

6. The wheeled vehicle of claim 1, wherein said second dome-shaped disk includes an inner annular rim defining said central opening, and said cover being coupled to said annular rim.

7. The wheeled vehicle of claim 1, comprising two wheels.

8. The wheeled vehicle of claim 1, wherein said cover includes an inwardly extending radial slot for receiving said hub.

9. The wheeled vehicle of claim 1, wherein said hub is rotatably coupled to said spaced-apart supporting members by a pin extending between said supporting members.

10. A two-wheeled vehicle comprising:

a frame having a pair of spaced-apart supporting members defining a fork;

a substantially U-shaped support having a pair of legs and being coupled to an end of one of said supporting members, wherein said legs extend inwardly with respect to said fork and define an upper face and a lower face, a first battery coupled to said upper face of said U-shaped support and a second battery coupled to said lower face of said U-shaped support;

an electric motor connected to said batteries; and a ground engaging drive wheel operatively connected to said electric motor, said drive wheel including an outer annular rim, an inner hub positioned between said legs of said U-shaped support, a first dome-shaped disk coupling said annular rim to said hub, a second dome-shaped disk coupled to said first dome-shaped disk and defining a central space, said second dome-shaped disk having a central opening, and a cover coupled to said second dome-shaped disk enclosing said U-shaped support and said batteries within said central space.

11. The two-wheeled vehicle of claim 10, wherein said cover includes a slot extending radially inward from an outer edge, and said hub extending through said slot.

* * * * *